(12) United States Patent
Hoyos et al.

(10) Patent No.: US 8,604,901 B2
(45) Date of Patent: Dec. 10, 2013

(54) ENSURING THE PROVENANCE OF PASSENGERS AT A TRANSPORTATION FACILITY

(75) Inventors: Hector T. Hoyos, New York, NY (US); Keith J. Hanna, Princeton Junction, NJ (US)

(73) Assignee: EyeLock, Inc., Tolima Valley Caguas, PR (US)

( * ) Notice: Subject to any disclaimer, the term of this patent is extended or adjusted under 35 U.S.C. 154(b) by 1211 days.

(21) Appl. No.: 11/823,338

(22) Filed: Jun. 27, 2007

(65) Prior Publication Data

US 2008/0122578 A1 May 29, 2008

Related U.S. Application Data

(60) Provisional application No. 60/805,925, filed on Jun. 27, 2006.

(51) Int. Cl.
*G06K 9/00* (2006.01)
*G05B 19/00* (2006.01)

(52) U.S. Cl.
USPC ......... 340/5.52; 340/5.53; 340/5.8; 340/5.81; 340/5.82; 340/5.83; 340/5.84; 382/115; 382/116; 382/117; 382/118; 382/119; 382/124

(58) Field of Classification Search
None
See application file for complete search history.

(56) References Cited

U.S. PATENT DOCUMENTS

| | | |
|---|---|---|
| 4,641,349 A | 2/1987 | Flom et al. |
| 5,259,040 A | 11/1993 | Hanna |
| 5,291,560 A | 3/1994 | Daugman |
| 5,488,675 A | 1/1996 | Hanna |
| 5,572,596 A | 11/1996 | Wildes et al. |
| 5,581,629 A | 12/1996 | Hanna et al. |
| 5,613,012 A | 3/1997 | Hoffman et al. |
| 5,615,277 A | 3/1997 | Hoffman |
| 5,737,439 A | 4/1998 | Lapsley et al. |

(Continued)

FOREIGN PATENT DOCUMENTS

| | | |
|---|---|---|
| WO | WO-2010/062371 | 6/2010 |
| WO | WO-2011/093538 | 8/2011 |

OTHER PUBLICATIONS

Daugman, J., How Iris Recognition Works, Jan. 2004, IEEE Transactions on Circuits and Systems for Video Technology, vol. 14, No. 1, pp. 21-30.*

(Continued)

*Primary Examiner* — George Bugg
*Assistant Examiner* — Renee Dorsey
(74) *Attorney, Agent, or Firm* — Cooley LLP

(57) ABSTRACT

The provenance of passengers intending to depart on a vehicle from a transportation facility, is ensured by providing biometric reading devices at both a check-in station and a departure area station of the facility. The name and/or other information concerning a passenger arriving at the facility is also entered for assessment into a background check system. A biometric template of the passenger is acquired by the reading device at the check-in station and forwarded to the departure area station. When the passenger appears at the latter station, a second biometric template is acquired by the reading device there. The second template is compared with each of a number of templates that were forwarded from the check-in station. If no match exists, or if the background check system returns an unsatisfactory assessment, the passenger is refused boarding onto the vehicle.

22 Claims, 2 Drawing Sheets

(56) References Cited

U.S. PATENT DOCUMENTS

| | | | |
|---|---|---|---|
| 5,764,789 A | 6/1998 | Pare et al. | |
| 5,802,199 A | 9/1998 | Pare et al. | |
| 5,805,719 A | 9/1998 | Pare et al. | |
| 5,838,812 A | 11/1998 | Pare et al. | |
| 5,901,238 A | 5/1999 | Matsushita | |
| 5,953,440 A | 9/1999 | Zhang et al. | |
| 5,978,494 A | 11/1999 | Zhang | |
| 6,021,210 A | 2/2000 | Camus et al. | |
| 6,028,949 A | 2/2000 | McKendall | |
| 6,064,752 A | 5/2000 | Rozmus et al. | |
| 6,069,967 A | 5/2000 | Rozmus et al. | |
| 6,070,159 A | 5/2000 | Wilson et al. | |
| 6,144,754 A | 11/2000 | Okano et al. | |
| 6,182,076 B1 | 1/2001 | Yu et al. | |
| 6,192,142 B1 | 2/2001 | Pare et al. | |
| 6,247,813 B1 | 6/2001 | Kim et al. | |
| 6,252,977 B1 | 6/2001 | Salganicoff et al. | |
| 6,289,113 B1 | 9/2001 | McHugh et al. | |
| 6,366,682 B1 | 4/2002 | Hoffman et al. | |
| 6,373,968 B2 | 4/2002 | Okano et al. | |
| 6,377,699 B1 | 4/2002 | Musgrave et al. | |
| 6,424,727 B1 | 7/2002 | Musgrave et al. | |
| 6,483,930 B1 | 11/2002 | Musgrave et al. | |
| 6,532,298 B1 | 3/2003 | Cambier et al. | |
| 6,542,624 B1 | 4/2003 | Oda | |
| 6,546,121 B1 | 4/2003 | Oda | |
| 6,594,376 B2 | 7/2003 | Hoffman et al. | |
| 6,594,377 B1 | 7/2003 | Kim et al. | |
| 6,652,099 B2 | 11/2003 | Chae et al. | |
| 6,700,998 B1 | 3/2004 | Murata | |
| 6,714,665 B1 | 3/2004 | Hanna et al. | |
| 6,734,783 B1 * | 5/2004 | Anbai | 340/5.52 |
| 6,760,467 B1 | 7/2004 | Min et al. | |
| 6,850,631 B1 | 2/2005 | Oda et al. | |
| 6,911,907 B2 * | 6/2005 | Kelliher et al. | 340/522 |
| 6,917,695 B2 | 7/2005 | Teng et al. | |
| 6,980,670 B1 | 12/2005 | Hoffman et al. | |
| 6,985,608 B2 | 1/2006 | Hoffman et al. | |
| 7,095,901 B2 | 8/2006 | Lee et al. | |
| 7,146,027 B2 | 12/2006 | Kim et al. | |
| 7,248,719 B2 | 7/2007 | Hoffman et al. | |
| 7,271,939 B2 | 9/2007 | Kono | |
| 7,277,891 B2 | 10/2007 | Hpward et al. | |
| 7,385,626 B2 | 6/2008 | Aggarwal et al. | |
| 7,414,737 B2 | 8/2008 | Cottard et al. | |
| 7,418,115 B2 | 8/2008 | Northcott et al. | |
| 7,428,320 B2 | 9/2008 | Northcott et al. | |
| 7,542,590 B1 | 6/2009 | Robinson et al. | |
| 7,558,406 B1 | 7/2009 | Robinson et al. | |
| 7,558,407 B2 | 7/2009 | Hoffman et al. | |
| 7,574,021 B2 | 8/2009 | Matey | |
| 7,583,822 B2 | 9/2009 | Guillemot et al. | |
| 7,606,401 B2 | 10/2009 | Hoffman et al. | |
| 7,616,788 B2 | 11/2009 | Hsieh et al. | |
| 7,639,840 B2 | 12/2009 | Hanna et al. | |
| 7,693,307 B2 | 4/2010 | Rieul et al. | |
| 7,697,786 B2 | 4/2010 | Camus et al. | |
| 7,715,595 B2 | 5/2010 | Kim et al. | |
| 7,719,566 B2 | 5/2010 | Guichard | |
| 7,797,606 B2 | 9/2010 | Chabanne | |
| 7,801,335 B2 | 9/2010 | Hanna et al. | |
| 7,869,627 B2 | 1/2011 | Northcott et al. | |
| 7,929,732 B2 | 4/2011 | Bringer et al. | |
| 7,978,883 B2 | 7/2011 | Rouh et al. | |
| 8,009,876 B2 | 8/2011 | Kim et al. | |
| 8,025,399 B2 | 9/2011 | Northcott et al. | |
| 8,092,021 B1 | 1/2012 | Northcott et al. | |
| 8,132,912 B1 | 3/2012 | Northcott et al. | |
| 8,170,295 B2 | 5/2012 | Fujii et al. | |
| 8,233,680 B2 | 7/2012 | Bringer et al. | |
| 8,243,133 B1 | 8/2012 | Northcott et al. | |
| 8,279,042 B2 | 10/2012 | Beenau et al. | |
| 8,317,325 B2 | 11/2012 | Raguin et al. | |
| 2002/0149467 A1 * | 10/2002 | Calvesio et al. | 340/5.52 |
| 2003/0058084 A1 * | 3/2003 | O'Hara | 340/5.53 |
| 2004/0190757 A1 * | 9/2004 | Murphy et al. | 382/115 |
| 2004/0258281 A1 | 12/2004 | Delgrosso et al. | |
| 2005/0084137 A1 | 4/2005 | Kim et al. | |
| 2005/0229007 A1 | 10/2005 | Bolle et al. | |
| 2006/0074986 A1 | 4/2006 | Mallalieu et al. | |
| 2006/0210119 A1 * | 9/2006 | Willis et al. | 382/115 |
| 2007/0211922 A1 | 9/2007 | Crowley et al. | |
| 2007/0241861 A1 * | 10/2007 | Venkatanna et al. | 340/5.52 |
| 2009/0074256 A1 | 3/2009 | Haddad | |
| 2009/0097715 A1 | 4/2009 | Cottard et al. | |
| 2009/0161925 A1 | 6/2009 | Cottard et al. | |
| 2009/0231096 A1 | 9/2009 | Bringer et al. | |
| 2009/0303037 A1 * | 12/2009 | Sweatte | 340/539.13 |
| 2010/0021016 A1 | 1/2010 | Cottard et al. | |
| 2010/0074477 A1 | 3/2010 | Fujii et al. | |
| 2010/0127826 A1 | 5/2010 | Saliba et al. | |
| 2010/0246903 A1 | 9/2010 | Cottard | |
| 2010/0278394 A1 | 11/2010 | Raguin et al. | |
| 2010/0310070 A1 | 12/2010 | Bringer et al. | |
| 2011/0158486 A1 | 6/2011 | Bringer et al. | |
| 2011/0194738 A1 | 8/2011 | Choi et al. | |
| 2011/0277518 A1 | 11/2011 | Lais et al. | |
| 2012/0240223 A1 | 9/2012 | Tu | |
| 2012/0257797 A1 | 10/2012 | Leyvand et al. | |

OTHER PUBLICATIONS

B. Galvin, et al., Recovering Motion Fields: An Evaluation of Eight Optical Flow Algorithms, Proc. of the British Machine Vision Conf. (1998).

J. R. Bergen, et al., Hierarchical Model-Based Motion Estimation, European Conf. on Computer Vision (1993).

K. Nishino, et al., The World in an Eye, IEEE Conf. on Pattern Recognition, vol. 1, at pp. 444-451 (Jun. 2004).

Notice of Allowance on U.S. Appl. No. 11/559,381 dated May 18, 2010.

R. Kumar, et al., Direct recovery of shape from multiple views: a parallax based approach, 12th IAPR Int'l Conf. on Pattern Recognition.

R. P. Wildes, Iris Recognition: An Emerging Biometric Technology, Proc. IEEE 85(9) at pp. 1348-1363 (Sep. 1997).

* cited by examiner

ENSURING THE PROVENANCE OF PASSENGERS AT A TRANSPORTATION FACILITY

CROSS-REFERENCE TO RELATED APPLICATION

This application claims priority under 35 U.S.C. §119(e) of U.S. Provisional Patent Application No. 60/805,925 filed Jun. 27, 2006, and entitled "Method for Ensuring the Provenance of Passengers in a Transportation System".

BACKGROUND OF THE INVENTION

1. Field of the Invention

The present invention concerns a system and process for ensuring the provenance of passengers who intend to board a vehicle at a transportation facility such as, e.g., a commercial airport.

2. Discussion of the Known Art

Certain public transportation systems or facilities must ensure the provenance of each passenger before allowing him or her to board a vehicle such as a commercial aircraft at the facility. As used herein, "provenance" implies (i) knowledge that a given person who has checked into a transportation facility is the same person who later appears at a departure area (gate) of the facility or who actually enters the vehicle, and (ii) knowledge of the person with respect to (a) the ability of him or her to pass successfully through immigration or other checks on arrival, and (b) a security assessment based, for example, on a background check in order to quantify a risk the passenger might pose to other individuals (passengers or otherwise) if allowed to board the vehicle. Knowledge of both the mentioned items (i) and (ii) will therefore allow a determination to be made of the passenger's overall fitness for travel through the facility.

U.S. Pat. No. 6,119,096 (Sep. 12, 2000) relates to a system and method for automated aircraft boarding and passenger billing, wherein passenger check-in and boarding is determined by the use of an iris recognition system in conjunction with associated passenger accounts. The patent does not address privacy issues concerning the anonymity of the biometric record, or certain instances in actual deployments wherein data attempted to be acquired from the iris is insufficient alone for recognition of a particular passenger (e.g., a blind person whose eyelids are closed) without other information. In addition, the patent is not concerned with the fitness of prospective passengers for boarding and traveling on an aircraft, nor does it disclose particular billing methods that may be optimal with respect to the transportation carrier or organization.

SUMMARY OF THE INVENTION

The present invention ensures the provenance of passengers in a transportation system without disrupting the flow of passenger movement through the system. The inventive system and process increases the level of passenger provenance above levels afforded by the known automated systems, while at the same time allowing for rapid passenger throughput.

According to one aspect of the invention, a process for ensuring the provenance of passengers in a transportation system includes providing a first biometric reading device at a first station associated with a check-in area of a transportation facility, providing a second biometric reading device at a second station associated with a departure or boarding area of the facility, acquiring a first biometric template of a given passenger arriving at the check-in area using the first reading device, and entering a name or other information corresponding to the given passenger into a background check system.

The acquired first biometric template is forwarded from the first station to the second station, and a second biometric template of the given passenger is acquired using the second reading device when the passenger appears at the second station associated with the departure or boarding area. The second biometric template is compared with each of a number of biometric templates forwarded to the second station from the first station and corresponding to all passengers who have checked in for departure on the same vehicle as the given passenger. The existence of a match between the second biometric template and one of the biometric templates forwarded from the first station is then determined.

For a better understanding of the invention, reference is made to the following description taken in conjunction with the accompanying drawing and the appended claims.

DETAILED DESCRIPTION OF THE INVENTION

Figure 1:
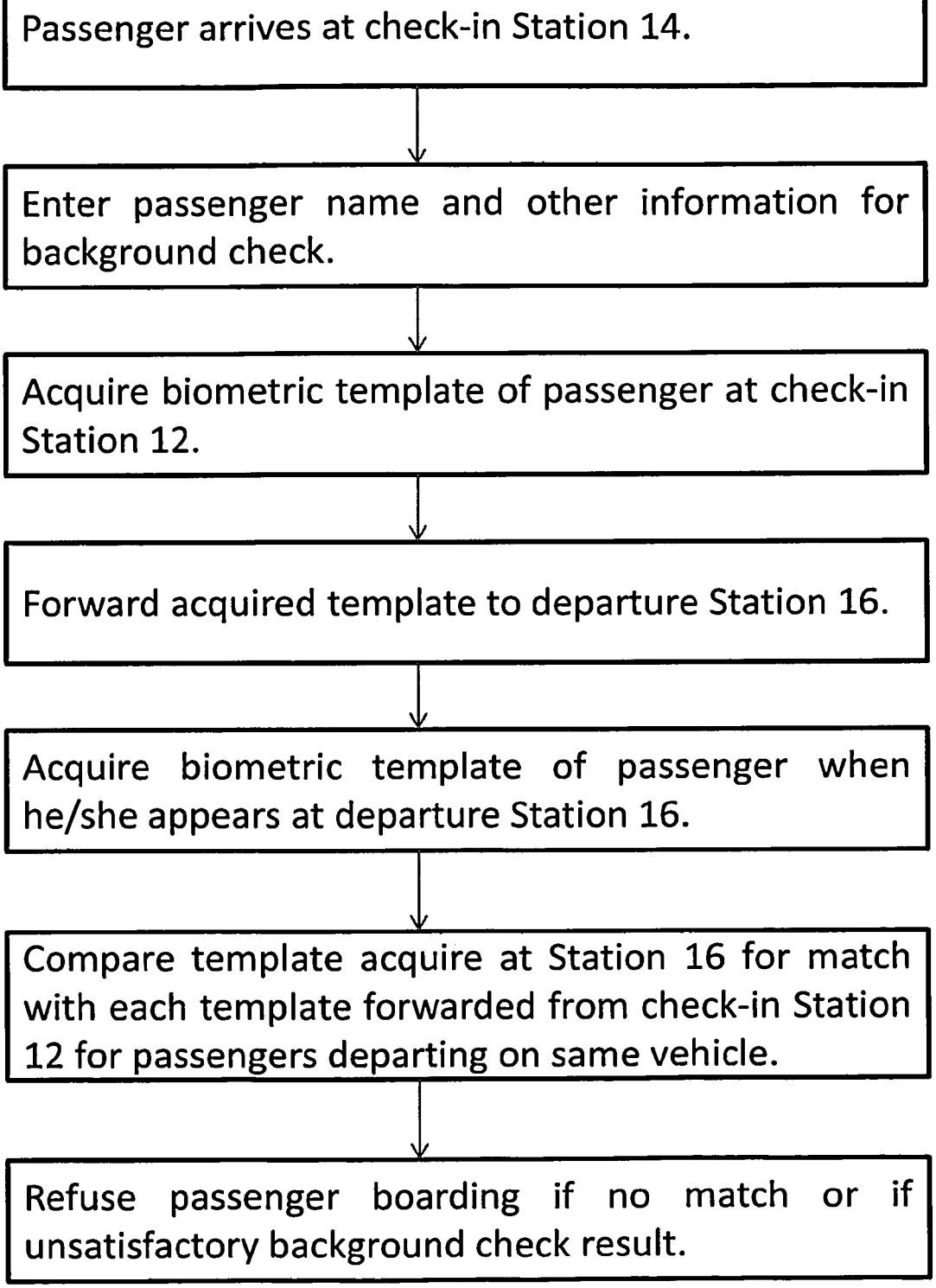
FIG. 1 is a flow chart representing steps of a process for ensuring the provenance of passengers, according to the invention.
Figure 2:
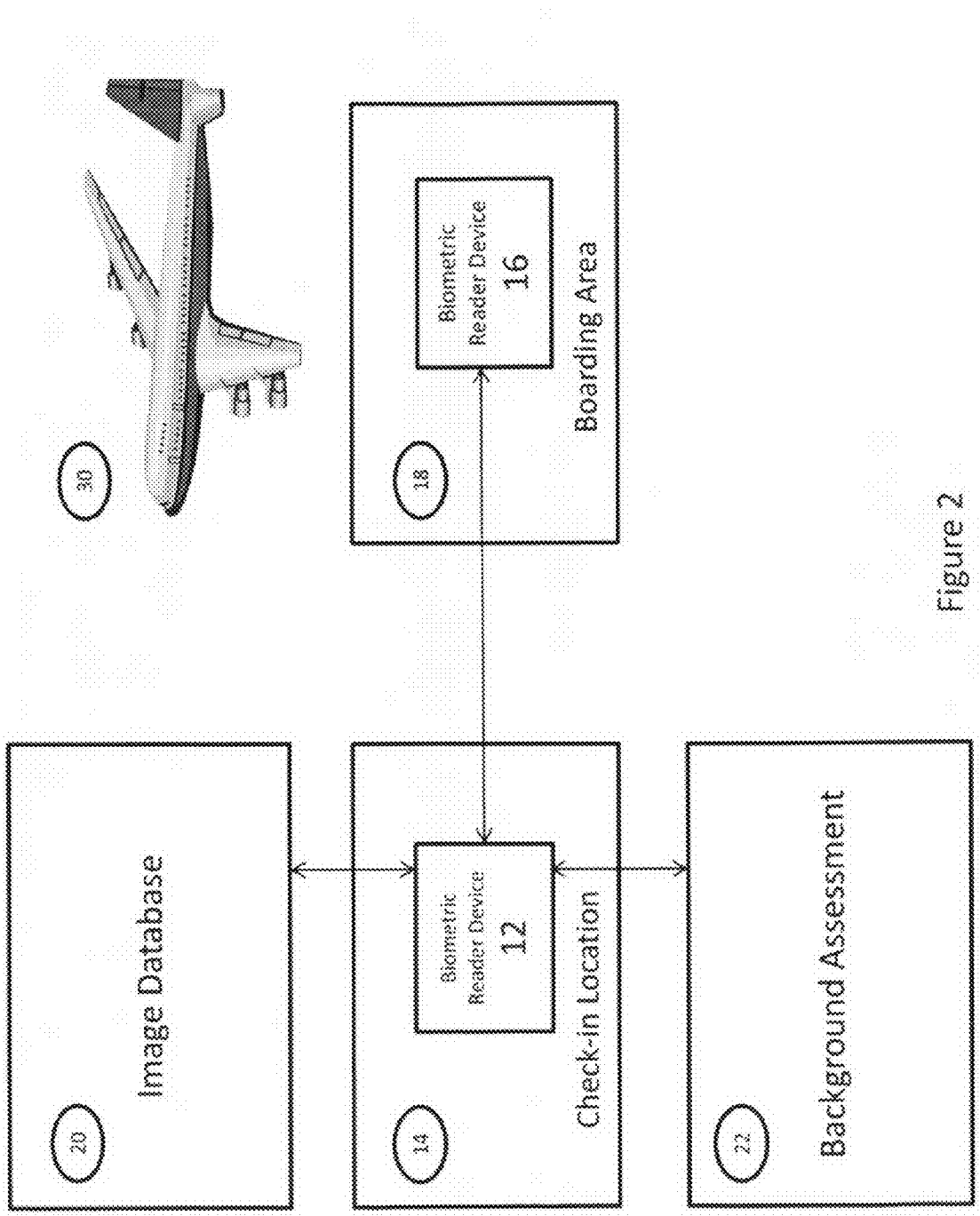
FIG. 2 is a block diagram of one embodiment of a system for implementing the process of FIG. 1, according to the invention.

FIG. 1 is a flow chart showing various steps of the inventive process for ensuring the provenance of passengers arriving at a transportation facility for travel. FIG. 2 is a block diagram showing one embodiment of a system for implementing the process according to the invention.

Basically, one or more stations are constructed and arranged to ensure that a given person who arrives and checks in at a transportation facility such as, for example, an airport, is the same person who later appears at a departure area or who actually boards a departing vehicle (e.g., a commercial aircraft). At least one biometric reading or enrollment station 12 is set up at a check-in location or area 14, and at least one biometric reading station 16 is set up in the vicinity of a gate or boarding area 18 where authorized passengers are allowed to enter a vehicle 30 for departure.

The meaning of the term "check-in" as used herein may vary depending on the particular implementation. For example, a "check-in" may correspond to a time when a certain level of confidence has been established (as may be required by an airline company) that a person who has presented himself or herself upon arriving at an airport, is actually the person they claim to be. This may be accomplished, for example, by verifying the prospective passenger's previous trip history, by comparing the person with his or her passport photo, or by verifying a biometric taken of the person at the station 12 against a biometric known to have been previously acquired for the person. Other definitions of "check-in" may also apply in the present invention.

The station 12 at the check-in location 14 serves to capture a biometric template of the prospective passenger. A commercially available biometric device provided at the station 12 is preferably capable of imaging at least the passenger's iris, since the iris is known to be more unique to a given individual than facial or fingerprint biometric. A suitable device for this purpose is the "HBox" system available from Global Rainmaker Inc., of New York. The HBox system has the advantage of acquiring both the face and the iris of an individual unobtrusively. As mentioned earlier, there may be instances where iris scanning is not suitable for certain individuals, and a device capable of acquiring other biometrics such as the passenger's face and/or fingerprint should be available at the enrollment station 12.

When there is no pre-existing biometric template for the passenger, a template may be captured (or "enrolled") for him or her by the device at the station 12. This template is then stored in a trusted database 20. If the passenger already has a biometric template in an existing trusted database 20, then a biometric template of the person may be read at the station 12 simply for verification with the pre-existing template, or no further reading may occur at this time.

Once a biometric for the prospective passenger has either been acquired, or recalled from the database 20 by the station 12 at check-in, the passenger is allowed to leave the check-in location 14. In cases where the passenger has previously enrolled in the system, the passenger may bypass the check-in location 14 and go directly to the second station 16. Knowledge that the passenger's biometric template requires transfer from the database 20 to the second station 16, may be provided by a known passenger control system such as, e.g., a so-called Departure Control System (DCS) used in air travel transportation systems. The DCS contains information concerning all passengers who are expected to leave on every flight from every gate of an airport facility.

The passenger's biometric template is made available to at least the second biometric reading station 16 located near the boarding area 18 for the transportation vehicle 30. At the second station 16, a biometric of the passenger is read by a second biometric device that may be the same or similar to the device(s) provided at the first station 12. The biometric read at the second station 16 is then compared with a number of biometric templates that have been forwarded from the secure database 20, using the DCS information to determine at which boarding area (or gate) 18 each of the passengers are expected to appear for departure.

If a biometric match is found, then the passenger is allowed entry and his or her record is flagged as being "about-to-board" with respect to the transportation vehicle 30. If a biometric match is not found, then the passenger is refused entry to the vehicle 30. If a failure-to-acquire error occurs in the biometric reading process, then standard manual checking processes may be invoked. Since it is contemplated that a vast majority of passengers will have their individual biometrics read successfully, minimal human resources are needed to manage those occasions requiring manual verification.

Additional biometric reading devices may be set up at other strategic locations, for example, at a security check point or other secure area, for continuously informing transportation employees of those passengers who are present. This arrangement may be used, for example, for purposes of passenger management and preventing persons not authorized to travel from entering the secure areas.

It may not be necessary to maintain a master registration database and/or to associate a biometric template with a passenger name or other personal information in a location out of the control of the individual. This simplifies compliance with privacy rules that vary widely from country to country, and can limit the transfer of data from one location to another. Also, this can be important in a transportation system where passengers frequently travel between countries under different jurisdictions. For example, in one instantiation, the credentials of the passenger are verified automatically (e.g., by a credit-card reader) or manually (e.g., by a check-in agent) and at the same time biometric data (e.g., the iris and face) for the passenger is acquired. The biometric data is stored, but is not associated with the passenger's name or other information that can be used to identify the individual. The biometric data is associated only with details of the journey on which the passenger is booked, such as, e.g., a flight number, flight departure time, and gate number. This biometric data is stored and sent to the biometric acquisition device at the second station where passenger provenance is to be verified.

For example, the second system may be located at the boarding gate. When the passenger arrives at the gate, the biometric system acquires biometric data for the passenger and then performs one-to-many matching through all the biometric data that is associated with the gate and the flight number, without the ability to associate a name or other identifying information to the individual. If biometric data acquired at the second biometric system matches any of the biometric data acquired at the first system where document verification was performed, then the passenger is expected on that journey, even though the name of the passenger is unknown to the system. Conversely, if a biometric match is not found, then the passenger is not expected on that journey and can be denied travel.

The above-mentioned second system requires biometrics that are capable of one-to-many matching, and are also capable of matching all individuals. A preferred embodiment uses an unobtrusive biometric acquisition system for both system one and system two, such as the HBox system provided by Global Rainmaker Inc, New York, N.Y., USA. This system acquires data for both the face and the iris since, as mentioned, in some cases insufficient iris area is available to rely on recognition alone, without additional information. This can be due to a physical ailment or other factors, and the face biometric is then used to supplement the iris biometric.

It is noted that the use of "anonymous" biometrics as disclosed herein for transportation systems and facilities, can also be used to provide information to users—for example, a flight number may be stored with a record as well as a generic "frequent flier" status of a given passenger, without any personal identifying information for the passenger. In this way, preferred customers may be treated differently, or any flight information for any customer may be provided without knowing their identity, thus helping to overcome privacy regulations.

Another feature of the inventive technique resides in preventing the entry of passengers who are not able to pass immigration or other checks on arrival, as well as flagging in real time those passengers who pose a greater security threat than that posed by other passengers. Specifically, at the time of the passenger's check-in or earlier, personal information such as, e.g., the name and the address of the passenger is collected. This information is then entered into an available manual or automatic background check system 22. Such systems typically provide an assessment rating or level of the individual's fitness-for-travel. One such system is the Personnel Assessment and Screening System (PASS) developed by L3 SyColeman.

The background check and the fitness-for-travel assessment are performed before the prospective passenger arrives at the boarding area 18. If the passenger is required to check in, then any uncertainty concerning the provenance of the passenger can be investigated immediately by designated employees at the check-in location 14 without affecting existing security processes, and before accepting the passenger's baggage (if any) for check in.

In any event, it is preferred that the fitness-for-travel assessment be completed before the passenger reaches a security checkpoint. In the latter case, a biometric reading device provided at the checkpoint acquires a biometric template. In a biometric match process, a search is performed through a database of all passengers who are due to pass though the gate(s) serviced by the security checkpoint.

For example, the DCS comprises a database containing at least the name, flight number and gate number associated with the passenger. That information is used to index into the secure database 20 containing the biometric information for the prospective passengers. The gate(s) serviced by the security checkpoint and the current time are used to index into the DCS to determine which passengers are expected at the security checkpoint. The biometric data for these passengers are then downloaded into the biometric system. This process is performed repeatedly over time such that new biometric data is added to the biometric system at the checkpoint as later flights are expected to leave, and old biometric information corresponding to flights earlier in the day are removed from the biometric system at the security checkpoint.

If a record is found, then the fitness-for-travel assessment may be used by security personnel to determine a specific course of action with respect to the passenger. If no record is found, then the subject has not checked in and is therefore not a valid passenger. For security or customer service reasons, a manual check may also be made in order to confirm the rejection.

Various approaches may be taken for recovering costs involved in setting up and operating a system according to the invention. In one approach, costs for the vast majority (if not all) of the equipment and information technology (IT) services required to set up a passenger provenance system according to the invention, are paid by an entity other than the carrier (e.g., airline company) that owns or operates the vehicle 30. The entity recovers the set up cost by levying a fee on each passenger. The fee may be paid directly by the passenger to the entity, or may be paid indirectly by the passenger to the carrier who in turn compensates the entity. The latter process may be implemented by allowing the carrier to levy a "passenger provenance fee" on the ticket purchase price, wherein a portion (or all) of the fee is automatically credited to the entity.

In one example, the biometric identification of the user is not used as a means to bill the individual user. This approach can increase the cost of travel to users of the biometric system, whereas the cost of travel remains the same for non-users of the biometric system who require more costly manual processing to maintain passenger provenance. One possible solution is to charge a single fee on all tickets within certain categories of travel, such as within domestic or international travel. This approach also simplifies or eliminates billing to the customer thereby reducing cost and increasing customer satisfaction.

The entity may be credited when it has performed the passenger provenance service for the transportation carrier. This can be performed automatically, for example, by treating the biometric read portion at the time of check-in as a "transaction" that authorizes a payment to be made from the carrier to the entity. The value of the transaction may vary depending on the particular configuration of passenger provenance system that the entity purchases. For example, the transportation carrier may require that the passenger background checks be performed randomly, or be performed only in response to a particular concern expressed by the check-in staff.

When a background check is performed, an additional "transaction" may be recorded so that a particular entity which performs the background check is compensated via an additional fee for each individual checked. The additional fee may be recovered, for example, by increasing the standard levy on all passengers so that, on average, the costs for all background checks as well as for the set-up and maintenance of the inventive passenger provenance system, are recovered.

In summary, the process and system disclosed herein operate to ensure that a given person who initially checks in at a transportation facility is the same person who appears at a departure area or who actually boards a departing vehicle, without having to identify the passenger by his/her name. That is, there is no need to associate the passenger's name with a corresponding biometric template acquired by the system. If a biometric template A is "enrolled" at the facility's check-in location for flight F, then the system need only ensure that the same template A appears later at the departure area for flight F. Measures are also provided to prevent boarding of those passengers who may not be able to pass through immigration or other background checks taken on arrival at the facility, and to enable flagging in real time of certain passengers who pose a potentially greater security threat in relation to other passengers. Approaches for recovering costs associated with the inventive process and system using means acceptable on the part of passengers and the transportation carrier, have also been described.

While the foregoing represents preferred embodiments of the invention, it will be understood by those skilled in the art that various modifications and changes may be made without departing from the spirit and scope of the invention, and that the invention includes all such modifications and changes as come within the scope of the following claims.

We claim:

1. A method for ensuring the provenance of passengers at a transportation facility, comprising:
   (a) providing a first biometric reading device at a first station, wherein the biometric is capable of one-to-many matching and acquiring a first biometric template;
   (b) storing in a secure database the first biometric template and associating it with one of:
   a gate number, a flight number, a security risk, an immigration status or other group and a time, without any associated information that uniquely identifies an individual corresponding to the first biometric template;
   (c) acquiring a second biometric template of a prospective passenger using a second biometric reading device at a second station;
   (d) indexing into the secure database based on the one of: the gate number, the flight number, the security risk, the immigration status or other group and the time, without using any associated information that uniquely identifies the prospective passenger corresponding to the second biometric template, to select a set of biometric templates of passengers expected to be at the second station based on the indexing, to forward to a biometric match process at the second station; and
   (e) determining, by the biometric match process via one-to-many matching without using any associated information that uniquely identifies the prospective passenger, if a match exists between the second biometric template and a biometric template from the set of biometric templates.

2. The method of claim 1, wherein acquiring the first biometric template comprises acquiring a biometric template of an iris.

3. The method of claim 2, further comprising acquiring face data at the same time as the iris biometric template.

4. The method of claim 1, wherein the set of biometrics is removed from access by the second biometric reading device based on one or more of gate number, flight number, security risk, immigration status, time or other group, and a subsequent set of biometrics with the same or different gate number, flight number, security risk, immigration status, time or other group is made available to the second biometric reading device.

5. The method of claim 1, wherein an unauthorized passenger is detected if no match exists between the second biometric template and the set of biometric templates.

6. The method of claim 1, wherein if a match exists between the second biometric template and the set of biometric templates, then the matched biometric template in the set of biometric templates is flagged.

7. The method of claim 1, wherein acquiring the first biometric template further comprises establishing a confidence level in the identity of the individual, that the individual is actually a person the individual claims to be.

8. The method of claim 7, wherein establishing the confidence level in the identity of the individual includes one of: verifying the individual's previous trip history, comparing the individual with his or her photo, and verifying the first biometric template against a biometric template known to have been previously acquired for the individual.

9. The method of claim 1, further comprising providing information to users or treating preferred customers differently based on one or more of the gate number, flight number, time or other group, based on the results of the biometric match process.

10. The method of claim 1, further comprising reducing storage requirements in the secure database by storing the first biometric template without any associated information that uniquely identifies the individual corresponding to the first biometric template.

11. The method of claim 1, further comprising ensuring privacy of passengers within the secure database by storing the first biometric template without any associated information that uniquely identifies the individual corresponding to the first biometric template.

12. A system for ensuring the provenance of passengers at a transportation facility, the system comprising:
a first biometric reading device at a first station, acquiring a first biometric template, wherein the biometric is capable of one-to-many matching;
a database, storing the first biometric template, associating the first biometric template with one of: a gate number, a flight number, a security risk, an immigration status or other group and a time, without any associated information that uniquely identifies an individual corresponding to the first biometric template, and selecting a set of biometric templates of passengers expected to be at a second station by indexing into the database based on the one of:
the gate number, the flight number, the security risk, the immigration status or other group and the time, without using any associated information that uniquely identifies the prospective passenger corresponding to the second biometric template, to forward to a second station; and
a second biometric reading device at the second station, acquiring a second biometric template from a prospective passenger, and determining, via a biometric match process performing one-to-many matching without using any associated information that uniquely identifies the prospective passenger, if a match exists between the second biometric template and a biometric template from the set of biometric templates.

13. The system of claim 12, wherein the first and second biometric templates correspond to the iris.

14. The system of claim 13, wherein the first biometric reading device acquires face data at the same time as the first biometric template.

15. The system of claim 12, wherein the database forwards a subsequent set of biometrics with the same or different gate number, flight number, security risk, immigration status, time or other group, to replace the selected set forwarded to the second biometric reading device.

16. The system of claim 12, wherein the second biometric reading device detects an unauthorized passenger if no match exists between the second biometric template and the forwarded set of biometric templates.

17. The system of claim 12, wherein the second biometric reading device flags the matched biometric template in the forwarded set of biometric templates if a match exists between the second biometric template and one within the forwarded set of biometric templates.

18. The system of claim 12, wherein the first biometric reading device establishes a confidence level in the identity of the individual, that the individual is actually a person the individual claims to be.

19. The system of claim 18, wherein first biometric reading device establishes a confidence level in the identity of the individual by one of: verifying the individual's previous trip history, comparing the individual with his or her photo, and verifying the first biometric template against a biometric template known to have been previously acquired for the individual.

20. The system of claim 12, wherein the second biometric reading device provides information to users or treats preferred customers differently based on one or more of the gate number, flight number, time or other group, and on the results of the biometric match process.

21. The method of claim 1, wherein (d) comprises indexing, responsive to privacy rules in effect at the second station, into the secure database without using any associated information that uniquely identifies the prospective passenger.

22. The method of claim 1, wherein (e) further comprises performing biometric matching at the second station using a different type of biometric acquired at the first station.

* * * * *

UNITED STATES PATENT AND TRADEMARK OFFICE
CERTIFICATE OF CORRECTION

PATENT NO. : 8,604,901 B2  
APPLICATION NO. : 11/823338  
DATED : December 10, 2013  
INVENTOR(S) : Hoyos et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1335 days.

Signed and Sealed this
Twenty-first Day of July, 2015

Michelle K. Lee
*Director of the United States Patent and Trademark Office*